(12) United States Patent
Rao

(10) Patent No.: US 8,576,837 B1
(45) Date of Patent: Nov. 5, 2013

(54) VOICE PACKET REDUNDANCY BASED ON VOICE ACTIVITY

(75) Inventor: Chandrashekhar Rao, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 852 days.

(21) Appl. No.: 12/625,988

(22) Filed: Nov. 25, 2009

Related U.S. Application Data

(60) Provisional application No. 61/145,850, filed on Jan. 20, 2009.

(51) Int. Cl.
*H04L 12/66* (2006.01)
(52) U.S. Cl.
USPC .......................................................... 370/352

(58) Field of Classification Search
None
See application file for complete search history.

(56) References Cited

U.S. PATENT DOCUMENTS

2003/0018480 A1\* 1/2003 Mecayten ..................... 704/277

\* cited by examiner

*Primary Examiner* — Yong Zhou

(57) ABSTRACT

One embodiment, having a corresponding method and computer program, features an apparatus comprising: an input circuit configured to receive packets of encoded voice data, wherein the encoded voice data includes intervals of voice activity and intervals of silence, and wherein each of the packets includes a packet sequence indicator; and a first packet circuit configured to transmit two or more of each packet that includes one or more of the intervals of voice activity, and configured to transmit only one of each packet that includes only intervals of silence.

18 Claims, 6 Drawing Sheets

VOICE PACKET REDUNDANCY BASED ON VOICE ACTIVITY

CROSS-REFERENCE TO RELATED APPLICATIONS

This application claims the benefit of U.S. Provisional Patent Application Ser. No. 61/145,850, filed on Jan. 20, 2009, the disclosure thereof incorporated by reference herein in its entirety.

FIELD

The present disclosure relates generally to the transmission of voice over packet data networks. More particularly, the present disclosure relates to the use of packet redundancy based on voice activity to improve the quality of the voice transmission.

BACKGROUND

Voice transmission increasingly relies on the use of packet data networks. Technologies such as VOIP have helped to popularize this method of voice transmission. However, packet networks are subject to packet loss. For non-real-time data, lost packets can be detected and retransmitted to complete the data set at the receiving end. But with real-time data such as voice data, retransmission is not a viable option because, by the time a lost packet is detected and retransmitted, it is too late for the packet to take its place in the stream of packets at the receiver.

SUMMARY

In general, in one aspect, an embodiment features an apparatus comprising: an input circuit configured to receive packets of encoded voice data, wherein the encoded voice data includes intervals of voice activity and intervals of silence, and wherein each of the packets includes a packet sequence indicator; and a first packet circuit configured to transmit two or more of each packet that includes one or more of the intervals of voice activity, and configured to transmit only one of each packet that includes only intervals of silence.

In general, in one aspect, an embodiment features a method comprising: receiving packets of encoded voice data, wherein the encoded voice data includes intervals of voice activity and intervals of silence, and wherein each of the first packets includes a packet sequence indicator; transmitting two or more of each packet that includes one or more of the intervals of voice activity; and transmitting only one of each packet that includes only intervals of silence.

In general, in one aspect, an embodiment features a computer program comprising: instructions for receiving packets of encoded voice data, wherein the encoded voice data includes intervals of voice activity and intervals of silence, and wherein each of the first packets includes a packet sequence indicator; instructions for transmitting two or more of each packet that includes one or more of the intervals of voice activity; and instructions for transmitting only one of each packet that includes only intervals of silence.

The details of one or more implementations are set forth in the accompanying drawings and the description below. Other features will be apparent from the description and drawings, and from the claims.

DESCRIPTION OF DRAWINGS

FIG. 4 shows an embodiment comprising a codec that does not support voice activity detection.

FIG. 5 shows an embodiment comprising a codec that supports voice activity detection.

FIG. 6 shows an embodiment comprising a codec that supports voice activity detection and places voice activity flags in RTP packet headers.

Figure 1:
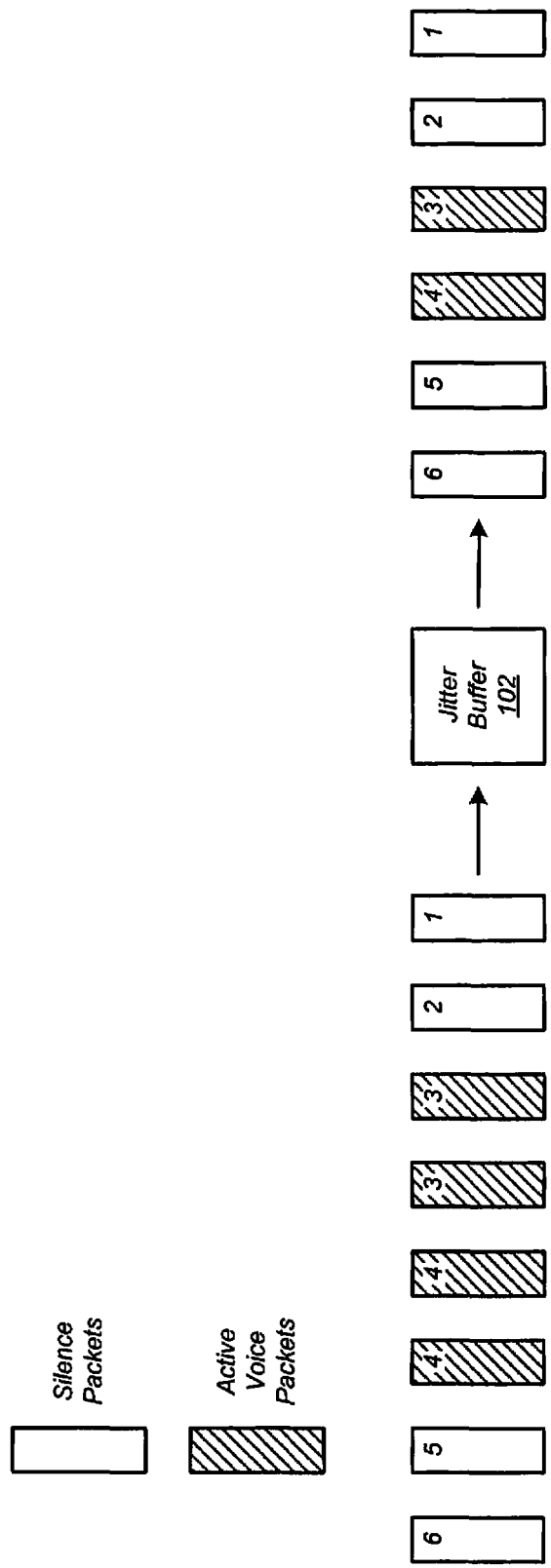
FIG. 1 graphically illustrates operation of some embodiments.

The leading digit(s) of each reference numeral used in this specification indicates the number of the drawing in which the reference numeral first appears.

DETAILED DESCRIPTION

Embodiments of the present disclosure employ packet redundancy based on voice activity to improve the quality of voice transmission over packet data networks. However, while the disclosed embodiments are described with reference to voice communications, the principles and techniques are readily extended to other sorts of real-time communications.

Statistics show that the normal conversational voice is active approximately 50% of the time. Voice data therefore generally include intervals of silence and intervals of voice activity. The described embodiments employ a voice activity detection module to detect voice activity in the voice packets. Voice activity detection modules are readily available, and are even integrated with some current codecs, where the codec provides voice activity information. The described embodiments employ packet redundancy for the active voice packets. That is, two or more of each active voice packet are transmitted over the network. Only one of each of the remaining "silence" packets is transmitted. FIG. 1 graphically illustrates this technique.

Referring to FIG. 1, voice packets are shown as rectangles with sequence numbers indicating the sequence of transmission of the packets. Active voice packets are shown as crosshatched, while silence packets are not. In the example of FIG. 1, one of each silence packet (packets 1, 2, 5 and 6) has been transmitted, while two of each active voice packet (packets 3 and 4) have been transmitted. A conventional jitter buffer 102 receives the packets. Jitter buffer 102 discards any redundant packets, so that only one copy of each packet is kept, as shown in FIG. 1. This technique increases the reliability of the voice transmission because it is unlikely that both copies of an active voice packet will be lost. In addition, bandwidth is conserved by transmitting only one of each silence packet. This is acceptable as the loss of a silence packet will not adversely affect the quality of the received voice transmission. In some implementations, the reliability of the voice transmission can be increased further by transmitting more that two copies of each active voice packet.

Figure 2:
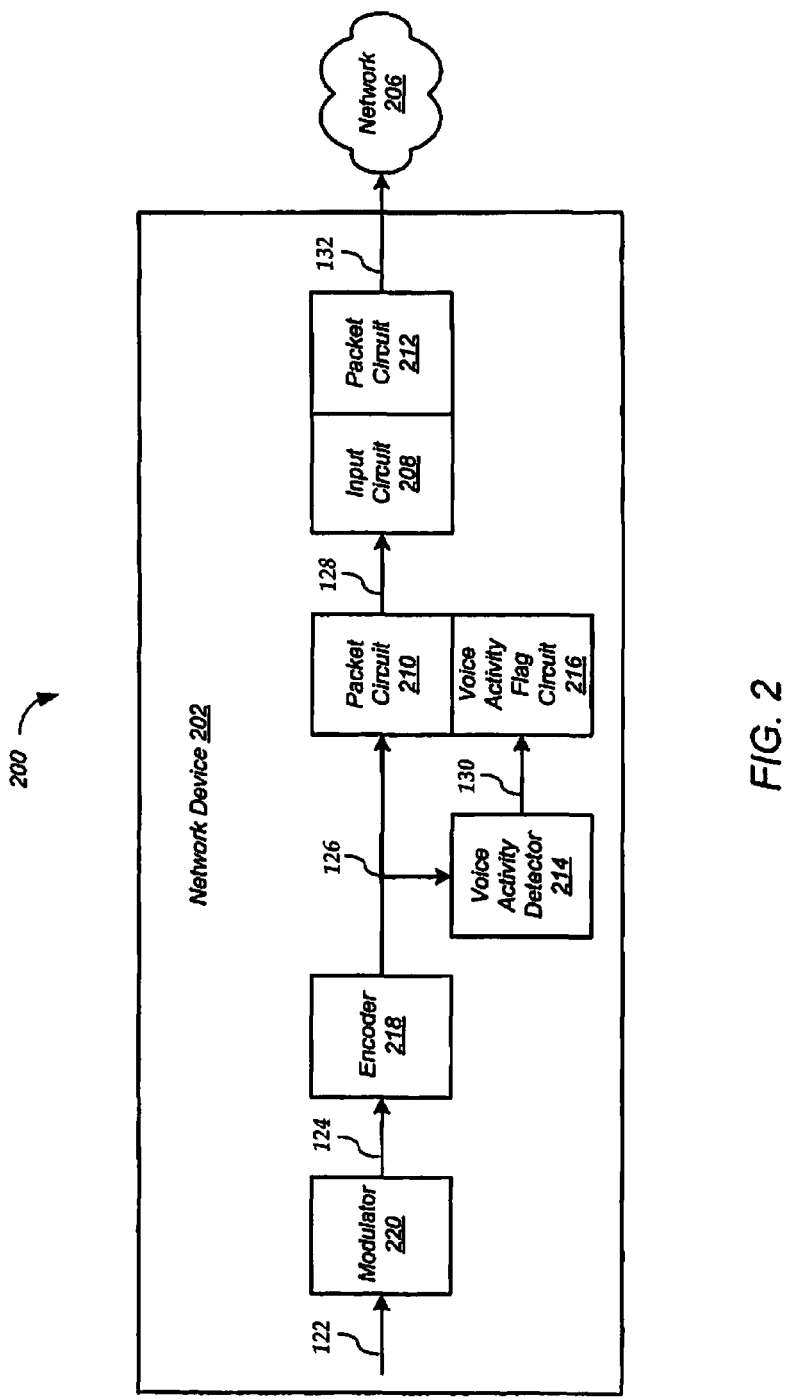
FIG. 2 shows elements of a voice communication system comprising a network device in communication with a network according to some embodiments.

FIG. 2 shows elements of a voice communication system 200 comprising a network device 202 in communication with a network 206 according to some embodiments. Although in the described embodiments, the elements of network device 202 are presented in one arrangement, other embodiments may feature other arrangements. For example, elements of network device 202 can be implemented in hardware, software, or combinations thereof.

Referring to FIG. 2, network device 202 can be implemented as a switch, router, network interface controller (NIC), and the like. Network 206 can be implemented as a wide-area network such as the Internet, a local-area network (LAN), wireless networks such as Wireless LANs, Worldwide Interoperability for Microwave Access (WiMAX), Long Term Evolution (LTE) and the like. While various embodiments are described with respect to network communications, they are also applicable to devices employing other forms of data communications such as direct links and the like. Network device 202 includes an input circuit 208, packet circuits 210 and 212, a voice activity detector 214, a voice activity flag circuit 216, an encoder 218, and a modulator 220.

Figure 3:
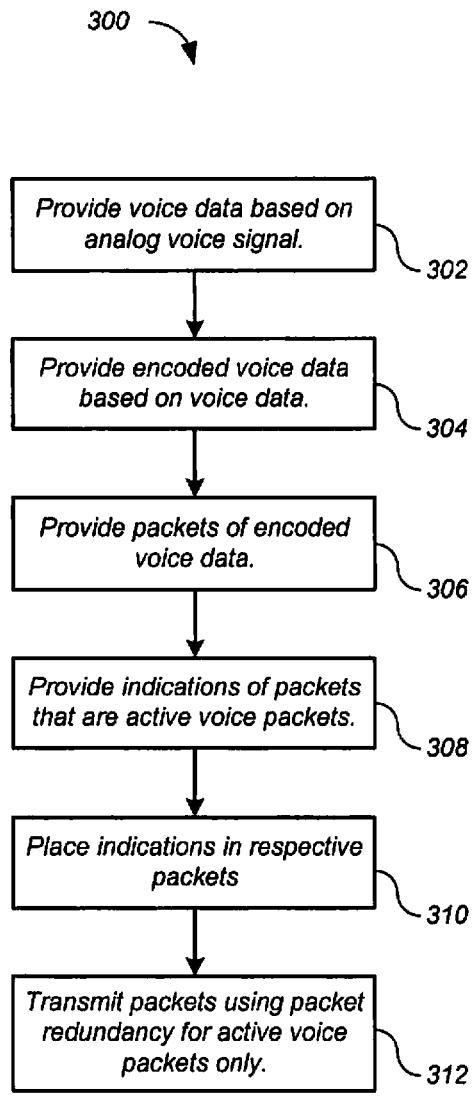
FIG. 3 shows a process for the network device of FIG. 2 according to some embodiments.

FIG. 3 shows a process 300 for network device 202 of FIG. 2 according to some embodiments. Although in the described embodiments, the elements of the disclosed processes are presented in one arrangement, other embodiments may feature other arrangements. For example, in various embodiments, some or all of the steps of the disclosed processes can be executed in a different order, concurrently, and the like.

Referring to FIGS. 2 and 3, at 302 modulator 220 provides voice data 124 based on an analog voice signal 122, which can be provided by a microphone or the like. At 304, encoder 218 provides encoded voice data 126 based on voice data 124. Any conventional modulation and encoding techniques can be used. Encoded voice data 126 includes intervals of voice activity and intervals of silence.

At 306, packet circuit 210 provides packets 128 of encoded voice data 126. Each packet 128 includes a packet sequence indicator. The packet sequence indicator can be a sequence number, timestamp, or the like. For example, packets 128 can be Real-time Transport Protocol (RTP) packets, each having a sequence number in the RTP header. Input circuit 108 receives packets 128.

At 308, voice activity detector 214 provides indications 130 of the packets 128 that are active voice packets, that is, the packets 128 that include one or more of the intervals of voice activity. For example, each indication 130 can be a flag or the like. At 310, voice activity flag circuit 216 places each indication 130 in the respective packet 128. In other embodiments, the flags are placed only in the active voice packets, or only in the silence packets.

At 312, packet circuit 212 transmits the packets 128 using packet redundancy for the active voice packets only. That is, packet circuit 212 transmits two or more of each packet 128 that includes an interval of voice activity, but only one of each packet 128 that includes only intervals of silence (that is, no intervals of voice activity). Packet circuit 212 employs indications 130 to identify the active voice packets 128. In some embodiments, packets 128 are encapsulated into packets 132 prior to transmission, for example using User Datagram Protocol (UDP) or the like.

The interval between transmission of redundant packets 128 (for example, between transmission of an active voice packet 128 and a copy of that packet 128) can be selected according to any technique. For example, the interval can be selected based on packet type, packet duration, network type, traffic type, receive jitter buffer depth, and the like. Table 1 shows example parameters for transmission of packets 128 using RTP over UDP based on packet duration and network type.

TABLE 1

| Network Type | Frame Duration | Redundant Packet Transmit Interval |
|---|---|---|
| Wired (LAN or WAN) | 10 ms | 5 to 8 ms |
|  | 20 ms | 8 to 16 ms |

TABLE 1-continued

| Network Type | Frame Duration | Redundant Packet Transmit Interval |
|---|---|---|
|  | 30 ms | 16 to 22 ms |
|  | 40 ms | 20 to 30 ms |
| Wireless (WLAN, WiMAX, or LTE) | 10 ms | 0-10 ms |
|  | 20 ms | 10-20 ms |
|  | 30 ms | 10-20 ms |
|  | 40 ms | 10-30 ms |

Figure 4:
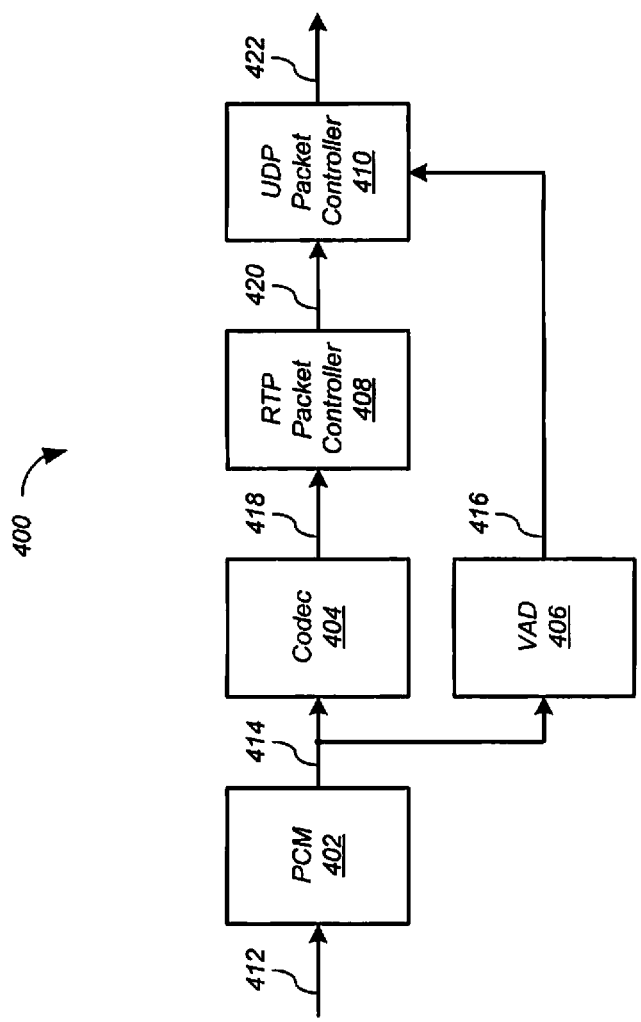
FIGS. 4-6 show various example embodiments.
Figure 5:
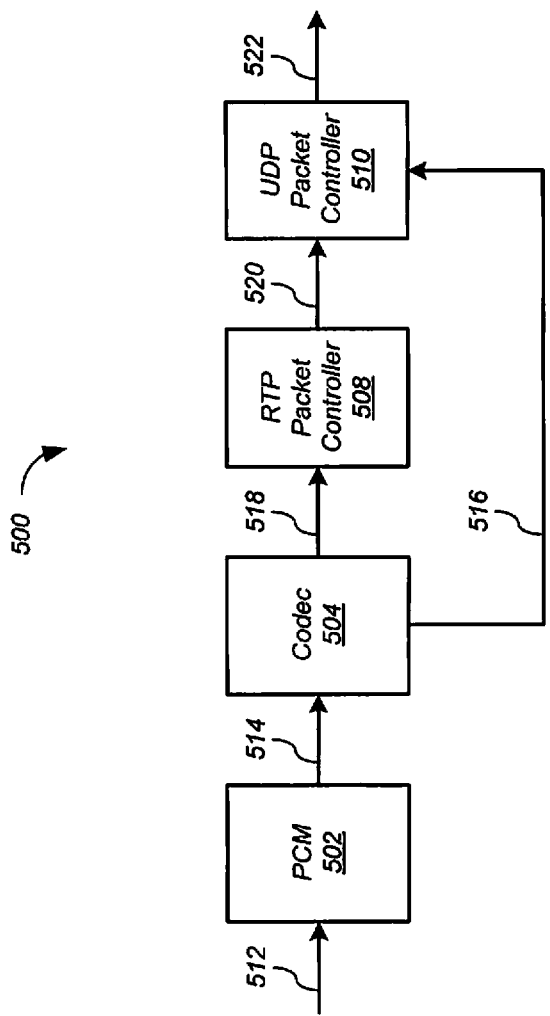
Figure 6:
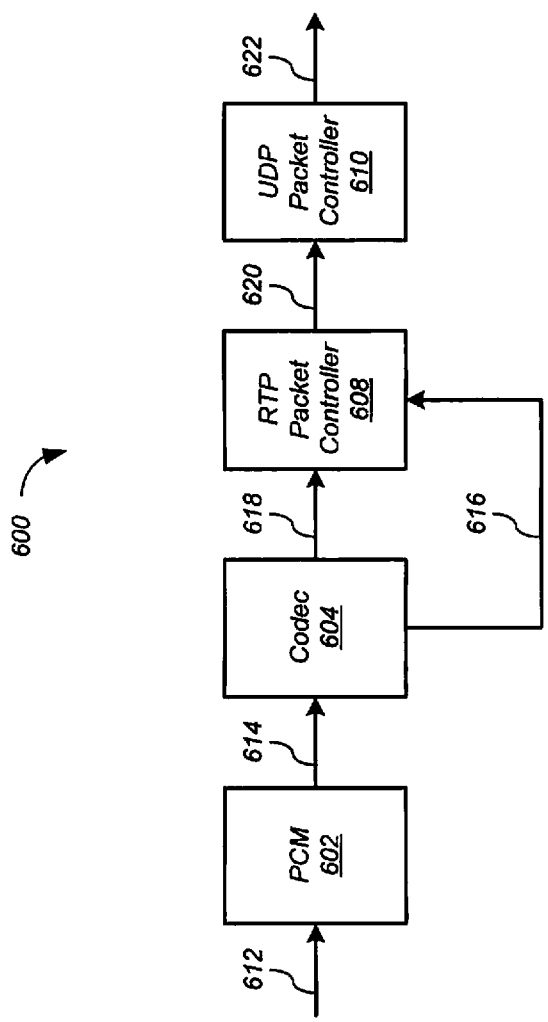

FIGS. 4-6 show various example embodiments. FIG. 4 shows an embodiment 400 comprising a codec that does not support voice activity detection. Referring to FIG. 4, embodiment 400 includes a pulse code modulator (PCM) 402, a codec 404, a voice activity detector (VAD) 406, an RTP packet controller 408, and a UDP packet controller 410. Based on an analog voice signal 412, PCM 402 provides a digital voice signal 414, which is provided to codec 404 and VAD 406. VAD 406 provides voice activity flags 416 that indicate intervals of silence and voice activity in digital voice signal 414.

Codec 404 provides encoded voice data 418 based on digital voice signal 414. RTP packet controller 408 provides RTP packets 420 of the encoded voice data. Each RTP packet 420 includes an RTP header bearing a packet sequence number. UDP packet controller 410 transmits UDP packets 422 based on RTP packets 420 and voice activity flags 416. In particular, UDP packet controller 410 transmits two or more of each UDP packet 422 that includes an interval of voice activity, but only one of each UDP packet 422 that includes only intervals of silence (that is, no intervals of voice activity).

FIG. 5 shows an embodiment 500 comprising a codec that supports voice activity detection. Referring to FIG. 5, embodiment 500 includes a pulse code modulator (PCM) 502, a codec 504, an RTP packet controller 508, and a UDP packet controller 510. Based on an analog voice signal 512, PCM 502 provides a digital voice signal 514, which is provided to codec 504. Codec 504 provides voice activity flags 516 that indicate intervals of silence and voice activity in digital voice signal 514.

Codec 504 provides encoded voice data 518 based on digital voice signal 514. RTP packet controller 508 provides RTP packets 520 of the encoded voice data. Each RTP packet 520 includes an RTP header bearing a packet sequence number. UDP packet controller 510 transmits UDP packets 522 based on RTP packets 520 and voice activity flags 516. In particular, UDP packet controller 510 transmits two or more of each UDP packet 522 that includes an interval of voice activity, but only one of each UDP packet 522 that includes only intervals of silence (that is, no intervals of voice activity).

FIG. 6 shows an embodiment 600 comprising a codec that supports voice activity detection and places voice activity flags in RTP packet headers. Referring to FIG. 6, embodiment 600 includes a pulse code modulator (PCM) 602, a codec 604, an RTP packet controller 608, and a UDP packet controller 610. Based on an analog voice signal 612, PCM 602 provides a digital voice signal 614, which is provided to codec 604. Codec 604 provides voice activity flags 616 that indicate intervals of silence and voice activity in digital voice signal 614.

Codec 604 provides encoded voice data 618 based on digital voice signal 614. RTP packet controller 608 provides RTP packets 620 of the encoded voice data. Each RTP packet 620 includes an RTP header bearing a packet sequence number. RTP packet controller 608 also places a voice activity flag 616 in each RTP packet 620.

UDP packet controller 610 transmits UDP packets 622 based on RTP packets 620 and the voice activity flags 616 placed in RTP packets 620. In particular, UDP packet controller 610 transmits two or more of each UDP packet 622 that includes an interval of voice activity, but only one of each UDP packet 622 that includes only intervals of silence (that is, no intervals of voice activity).

Various embodiments can be implemented in digital electronic circuitry, or in computer hardware, firmware, software, or in combinations of them. Embodiments can be implemented in a computer program product tangibly embodied in a machine-readable storage device for execution by a programmable processor; and method steps can be performed by a programmable processor executing a program of instructions to perform functions by operating on input data and generating output. Embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the scope of the disclosure. Accordingly, other implementations are within the scope of the following claims.

What is claimed is:

1. An apparatus comprising:
    first packet circuit configured to receive a plurality of packets of encoded voice data, wherein the plurality of packets include
        voice packets, wherein each of the voice packets includes one or more intervals of voice activity, and
        silence packets, wherein each of the silence packets are void of voice activity,
        wherein each of the plurality of packets includes a sequence indicator, and wherein the sequence indicators of the plurality of packets indicate an order of the plurality of packets;
    a second packet circuit configured to, based on the sequence indicators of the plurality of packets, transmit (i) two or more of each of the voice packets, and (ii) only one of each of the silence packets;
    a voice activity detector configured to (i) detect which of the plurality of packets are the voice packets, and (ii) generate an indication signal indicating which of the plurality of packets are the voice packets; and
    a flag circuit configured to insert a flag in either (i) each of the voice packets and not the silence packets, or (ii) each of the silence packets and not the voice packets, wherein the flags indicate which of the plurality of packets are voice packets.

2. The apparatus of claim 1, further comprising an encoder configured to encode voice data to generate the plurality of packets of the encoded voice data.

3. The apparatus of claim 2, further comprising a modulator configured to (i) receive an analog voice signal, and (ii) modulate the analog voice signal to generate the voice data encoded by the encoder.

4. A network device comprising the apparatus of claim 3.

5. The apparatus of claim 1, wherein the plurality of packets are real-time transport protocol packets.

6. The apparatus of claim 1, wherein the flag circuit is configured to insert a flag in each of the voice packets and not the silence packets.

7. The apparatus of claim 1, wherein the flag circuit is configured to insert a flag in each of the silence packets and not the voice packets.

8. The apparatus of claim 1, wherein:
    the first circuit is configured to generate real-time transport protocol packets based on the plurality of packets of the encoded voice data; and
    the second circuit is configured to generate user datagram protocol packets based on (i) the real-time transport protocol packets, and (ii) the indication signal.

9. The apparatus of claim 8, further comprising an encoder configured to encode voice data to generate the plurality of packets of the encoded voice data,
    wherein the voice activity detector is separate from the encoder.

10. The apparatus of claim 1, wherein:
    the first circuit is configured to generate real-time transport protocol packets based on (i) the plurality of packets of the encoded voice data, and (ii) the indication signal; and
    the second circuit is configured to generate user datagram protocol packets based on the real-time transport protocol packets.

11. The apparatus of claim 10, further comprising an encoder configured to encode voice data to generate the plurality of packets of the encoded voice data,
    wherein the encoder includes the voice activity detector.

12. A method comprising:
    receiving a plurality of packets of encoded voice data, wherein the plurality of packets include
        voice packets, wherein each of the voice packets includes one or more intervals of voice activity, and
        silence packets, wherein each of the silence packets are void of voice activity,
        wherein each of the plurality of packets includes a sequence indicator, and wherein the sequence indicators of the plurality of packets indicate an order of the plurality of packets;
    based on the sequence indicators of the plurality of packets, transmitting (i) two or more of each of the voice packets, and (ii) only one of each of the silence packets;
    detecting which of the plurality of packets are the voice packets and generating an indication signal indicating which of the plurality of packets are the voice packets; and
    inserting a flag in either (i) each of the voice packets and not the silence packets, or (ii) each of the silence packets and not the voice packets, wherein the flags indicate which of the plurality of packets are voice packets.

13. The method of claim 12, further comprising encoding voice data based to generate the plurality of packets of the encoded voice data.

14. The method of claim 13, further comprising:
receiving an analog voice signal; and
modulating the analog voice signal to generate the voice data encoded by the encoder.

15. The method of claim 12, wherein the plurality of packets are real-time transport protocol packets.

16. A non-transitory computer-readable medium storing a computer program executable by a processor, wherein the computer program comprises instructions for:
receiving a plurality of packets of encoded voice data, wherein the plurality of packets include
voice packets, wherein each of the voice packets includes one or more intervals of voice activity, and
silence packets, wherein each of the silence packets are void of voice activity,
wherein each of the plurality of packets includes a sequence indicator, and wherein the sequence indicators of the plurality of packets indicate an order of the plurality of packets;
based on the sequence indicators of the plurality of packets, transmitting (i) groups of the voice packets, and (ii) silence packets between the groups of the voice packets, wherein between consecutive ones of the groups of the voice packets is only one of the silence packets, wherein each of the groups of the voice packets includes two or more of the voice packets;
detecting which of the plurality of packets are the voice packets and generating an indication signal indicating which of the plurality of packets are the voice packets; and
inserting a flag in either (i) each of the voice packets and not the silence packets, or (ii) each of the silence packets and not the voice packets, wherein the flags indicate which of the plurality of packets are voice packets.

17. The non-transitory computer-readable medium of claim 16, wherein the computer program further comprises instructions for encoding voice data to generate the plurality of packets of the encoded voice data.

18. The non-transitory computer-readable medium of claim 17, wherein the computer program further comprises instructions for:
receiving an analog voice signal, and
modulating the analog voice signal to generate the voice data encoded to generate the plurality of packets.

* * * * *